United States Patent
Ohgane et al.

[11] Patent Number: 5,875,173
[45] Date of Patent: Feb. 23, 1999

[54] COMMUNICATION CONTROL DEVICE AND METHOD FOR USE IN AN ATM SYSTEM OPERABLE IN AN ABR MODE

[75] Inventors: Shoji Ohgane; Yasuharu Tomimitsu, both of Tokyo, Japan

[73] Assignee: NEC Corporation, Tokyo, Japan

[21] Appl. No.: 655,219

[22] Filed: Jun. 5, 1996

[30] Foreign Application Priority Data

Jun. 5, 1995 [JP] Japan .................................. 7-137852

[51] Int. Cl.[6] .................................. H04L 12/52
[52] U.S. Cl. ..................... 370/230; 370/236; 370/409
[58] Field of Search .................... 370/232, 233, 370/234, 253, 357, 391, 395, 468, 230, 231, 235, 229, 409, 236, 237, 355, 394

[56] References Cited

U.S. PATENT DOCUMENTS

| | | | |
|---|---|---|---|
| 5,119,367 | 6/1992 | Kawkatsu et al. | 370/232 |
| 5,319,638 | 6/1994 | Lin | 370/235 |
| 5,515,359 | 5/1996 | Zheng | 370/231 |
| 5,617,416 | 4/1997 | Damien | 370/391 |
| 5,633,870 | 5/1997 | Gaytan et al. | 370/23 |
| 5,638,371 | 6/1997 | Raychaudhun et al. | 370/395 |
| 5,649,110 | 7/1997 | Ben-Nun et al. | 370/351 |
| 5,675,576 | 10/1997 | Kalampoukas et al. | 370/232 |
| 5,677,906 | 10/1997 | Hayter et al. | 370/235 |
| 5,684,791 | 11/1997 | Raychaudhuri et al. | 370/395 |
| 5,699,346 | 12/1997 | Van Dervort | 370/233 |
| 5,737,313 | 4/1998 | Kolarov et al. | 370/234 |

*Primary Examiner*—Chau Nguyen
*Assistant Examiner*—Kenneth Vanderpuye
*Attorney, Agent, or Firm*—Foley & Lardner

[57] ABSTRACT

In an ATM communication control device, a cell transmission timing via a virtual channel is determined based on peak rate instructed in a received predetermined ATM cell, such as a received RM cell. Upon determining the transmission timing, a next transmission time for a virtual channel is stored in a CAM, and when a counter value agrees with the stored transmission time, the virtual channel corresponding to an address storing the agreed transmission time is determined as a virtual channel for transmission. The CAM may be replaced by a combination of comparators and a normal storage device.

18 Claims, 8 Drawing Sheets

COMMUNICATION CONTROL DEVICE AND METHOD FOR USE IN AN ATM SYSTEM OPERABLE IN AN ABR MODE

BACKGROUND OF THE INVENTION

The present invention relates to a communication control device and a communication control method for use in transmitting ATM (Asynchronous Transfer Mode) cells in an ATM network.

In general, the ATM network of this kind includes a plurality of ATM terminals and an ATM server which are connected to each other via ATM switches. Normally, each of the ATM server and each of the ATM terminals is provided with a communication control device, as an ATM device, for transmitting ATM cells.

From the ATM terminals and the ATM server, ATM cells each having a header and a payload are sent to the ATM switches or the like via VCs (virtual channels) assigned to the ATM terminals and the ATM server. For controlling the data transmission rate of the ATM cell, a CBR (constant bit rate) mode is normally used. In the CBR mode, when the ATM cells are transmitted using a certain VC, a peak rate representing a minimum interval between the ATM cells in the same VC and a mean rate representing a mean value of transmission rates for a long time are fixedly determined before transmission of the ATM cells, and these rates are held unchanged during transmission of the ATM cells via the VC. As appreciated from this, the same VC is assigned in a time-division fashion at time intervals, that is, at a constant rate determined by the peak rate and the mean rate.

In the CBR mode, for keeping the foregoing rate and controlling data transmission timings among the ATM terminals and the ATM server in the network, a traffic shaper is provided at each of the ATM devices of the ATM terminals and the ATM server. This means that, during transmission of the ATM cells via the particular VC, the particular traffic shaper is fixedly connected. Thus, as many traffic shapers are required as.

Further, in the CBR mode, when the cells are transmitted at peak rates via a plurality of the VCs and full on the transmission line, it is possible that the cells can not be transmitted via another VC on the same line. Accordingly, when employing the CBR mode, it is necessary to assume in advance that a number of the VCs are used on the same line, and set a peak rate of each VC with a margin. Thus, the CBR mode h as a drawback where vacancies occur on the line or a drawback where a VC which can not transmit the cells is generated.

On the other hand, instead of the CBR mode an ABR (available bit rate) mode has been proposed as a de facto standard by an organization called The ATM Forum. In the ABR mode, since a peak rate of the VC c an be changed dynamically during transmission, cells can be newly transmitted via another VC by adjusting a band of the transmission line, that is, a transmission density. Accordingly, in the ABR mode, as compared with the CBR mode, since the peak rate can be freely changed, the transmission density can be flexible, and thus, the high-density transmission can be achieved with fewer virtual channels which can not transmit the cells.

However, in practice, specific operations and structures of the ATM device suited for the ABR mode have not been proposed up to now.

Now, it is assumed that the ATM devices having the traffic shapers employed in the CBR mode are applied to the ABR mode. In this case, since each traffic shaper regulates a fixed bit rate, it is necessary, for dealing with a plurality of the bit rates, to provide a plurality of the traffic shapers, each corresponding to one of the bit rates, relative to one VC. Further, the software is necessary for dynamically switching among the traffic shapers at high speed during transmission on the same VC.

However, the switching based on the software takes time and can not achieve real-time processing.

Further, if the foregoing structure for the CBR mode is applied to the ABR mode, it can not deal an increment the number of the VCs. Specifically, due to the recent advancement in ATM technique, it has been required that one ATM device controls as many as 1,000 VCs. Now, it is assumed that the foregoing CBR mode structure is applied to the ABR mode where three bit rates are switched relative to one VC. In this case, three traffic shapers are necessary relative to one VC so that as many as 3,000 traffic shapers are required for one ATM device. This makes the structure of the ATM device complicated. Further, on a practical basis, it is difficult to realize as many as 3,000 traffic shapers on a single LSI chip.

As appreciated from the foregoing, it is practically difficult to apply the software and the hardware of the CBR mode to the ABR mode with respect to both software and hardware.

SUMMARY OF THE INVENTION

It is an object of the present invention to provide a communication control device for an ATM system applicable to an ABR mode and its control method.

It is another object of the present invention to provide a communication control device for an ATM system capable of easily dealing with increasing the number of virtual channels and its control method.

It is another object of the present invention to provide a communication control device for an ATM system requiring no high-speed software and its control method.

It is another object of the present invention to provide a communication control device for an ATM system applicable to not only an ABR mode but also a CBR mode and its control method.

Other objects of this invention will become clear as the description proceeds.

According to an aspect of the present invention, there is provided a communication control device comprising a transmitting section for outputting transmission data, and a receiving section for receiving and detecting predetermined data, the transmitting section including timing adjusting means connected to the receiving section for updating a transmission timing of the transmission data based on the predetermined data, the transmitting section transmitting the transmission data in accordance with the transmission timing.

According to another aspect of the present invention, there is provided a communication control device comprising a timing counter, an associative memory connected to the timing counter for storing a transmission timing and an address of transmission data, the associative memory comparing an output of the timing counter and the stored transmission timing so as to output the address corresponding to the agreed transmission timing, storing means for storing the transmission data, and means connected to the associative memory and the storing means for carrying out a data accessing operation for the storing means with reference to the address that is outputted from the associative memory.

According to another aspect of the present invention, there is provided a communication control device comprising first storing means for storing transmission data, second storing means for storing a transmission timing of the transmission data, a timing counter, comparing means connected to the second storing means and the timing counter for comparing an output of the timing counter and an output of the second storing means, third storing means for storing a transmission interval of the transmission data, adding means connected to the second and the third storing means and the comparing means for adding an output read out from the third storing means based on an output of the comparing means and the transmission timing, and accessing means connected to the first storing means and the comparing means for carrying out a data accessing operation for the first storing means with reference to the output of the comparing means.

According to another aspect of the present invention, there is provided an ATM communication control device for transmitting ATM cells onto a line through virtual channels. The device comprises first storing means for storing transmission data corresponding to each of the virtual channels, second storing means for storing transmission timings of the transmission data, a timing counter, comparing means connected to the second storing means and the timing counter for comparing an output of the timing counter and an output of the second storing means, third storing means for storing a transmission interval of the transmission data corresponding to each of the virtual channels, adding means connected to the second and the third storing means and the comparing means for adding an output read out by performing an address designation relative to the third storing means based on an output of the comparing means and the transmission timing, and accessing means connected to the first storing means and the comparing means for carrying out a data accessing operation for the first storing means with reference to the output of the comparing means.

It may be arranged that the ATM communication control device further comprises a priority encoder which, when the output of the timing counter agrees with a plurality of outputs of the second storing means in the comparing means, selects and outputs one of the plurality of outputs according to a priority order thereof, wherein the data access is performed relative to the first storing means based on the output of the priority encoder.

According to another aspect of the present invention, there is provided an ATM communication control device for transmitting ATM cells onto a line through virtual channels. The device comprises first storing means for storing transmission data for each of the virtual channels, second storing means for storing a transmission timing of the transmission data for each of the virtual channels, a timing counter, comparing means connected to the second storing means and the timing counter for comparing an output of the timing counter and an output of the second storing means, third storing means for storing a transmission interval of the transmission data for each of the virtual channels, fourth storing means for storing an address of the first storing means for each of the virtual channels, adding means connected to the comparing means and the second and the third storing means for adding an output read out by performing an address designation relative to the third storing means based on an output of the comparing means and the transmission timing, and reading out means connected to the comparing means and the first and the fourth storing means for reading out the transmission data of the first storing means based on an output read out by performing an address designation relative to the fourth storing means based on the output of the comparing means, the reading out means transmitting the transmission data on to the line as an ATM cell.

According to another aspect of the present invention, there is provided a communication control method comprising the steps of counting timings in sequence, storing transmission timings of transmission data into an associative memory, comparing the counted timing with the store d transmission timings, outputting from the associative memory, when the counted timing agrees with a plurality of the stored transmission timings, an address corresponding to one of the agreed transmission timings which is selected according to a priority order thereof, and data-accessing storing means storing the transmission data based on the address outputted from the associative memory.

According to another aspect of the present invention, there is provided a communication control method comprising the steps of comparing a value of a timing counter and transmission timings of data, data-accessing storing means depending on a comparing result, adding the data transmission timing and a transmission interval of the data, setting an adding result to a transmission timing of next data, selecting and outputting, when a plurality of outputs are detected as being agreed based on the comparing result, a plurality of the outputs according to a priority order thereof, and data-accessing the storing means based on the selected outputs.

According to another aspect of the present invention, there is provided an ATM communication control method comprising the steps of comparing a value of a timing counter and transmission timings of data, reading out data from a region of a corresponding virtual channel in storing means depending on a comparing result and outputting the data onto a line as an ATM cell, adding the transmission timing of the data and a transmission interval of the data, and setting an adding result to a next data transmission timing.

It may be arranged that the ATM communication control method further comprises the steps of selecting and outputting, when a plurality of outputs are detected as being agreed based on the comparing result, a plurality of the outputs according to a priority order thereof, and reading out the data from the regions of the corresponding virtual channels in the storing means based on the selected outputs and outputting the data onto the line as the ATM cells.

According to another aspect of the present invention, there is provided an ATM device comprising a receiving section for receiving ATM cells. The receiving section comprises detecting means for detecting reception of a predetermined ATM cell among the ATM cells, and deriving means connected to the detecting means for deriving a transmission timing for a virtual channel assigned to the ATM device, from the received predetermined ATM cell.

It may be arranged that, in the ATM device, the predetermined ATM cell is an RM (resource management) cell.

It may be arranged that, in the ATM device, the RM cell has a peak rate for the virtual channel, the deriving means adding a current transmission time for the virtual channel and the peak rate so as to derive a next transmission timing for a virtual channel.

It may be arranged that the ATM device further comprises a control memory for storing the peak rate, the current transmission time and the derived transmission timing.

It may be arranged that the ATM device further comprises a transmitting section, the transmitting section comprising a counter for indicating a transmission time of the virtual channel by means of a counter value, determining means connected to the control memory and the counter for determining a virtual channel for transmission based on the counter value and the transmission time read out from the control memory, and transmitting means connected to the determining means for transmitting an ATM cell using the determined virtual channel.

It may be arranged that, in the ATM device, the determining means comprises an associative memory having an address corresponding to each of the virtual channels, storing the transmission time corresponding to each of the virtual channels, and outputting, when the counter value agrees with the stored transmission time, the corresponding virtual channel.

It may be arranged that, in the ATM device, the determining means further comprises a priority encoder for performing a priority control when the counter value agrees with a plurality of the stored transmission times.

It may be arranged that, in the ATM device, the determining means comprises comparing means connected to the control memory and the counter for comparing the counter value with the transmission time read out from the control memory, and storing means connected to the comparing means for storing the virtual channel for which the counter value and the transmission time agree with each other.

It may be arranged that, in the ATM device, the receiving section and the transmitting section are formed by a semiconductor integrated circuit chip.

Figure 7:
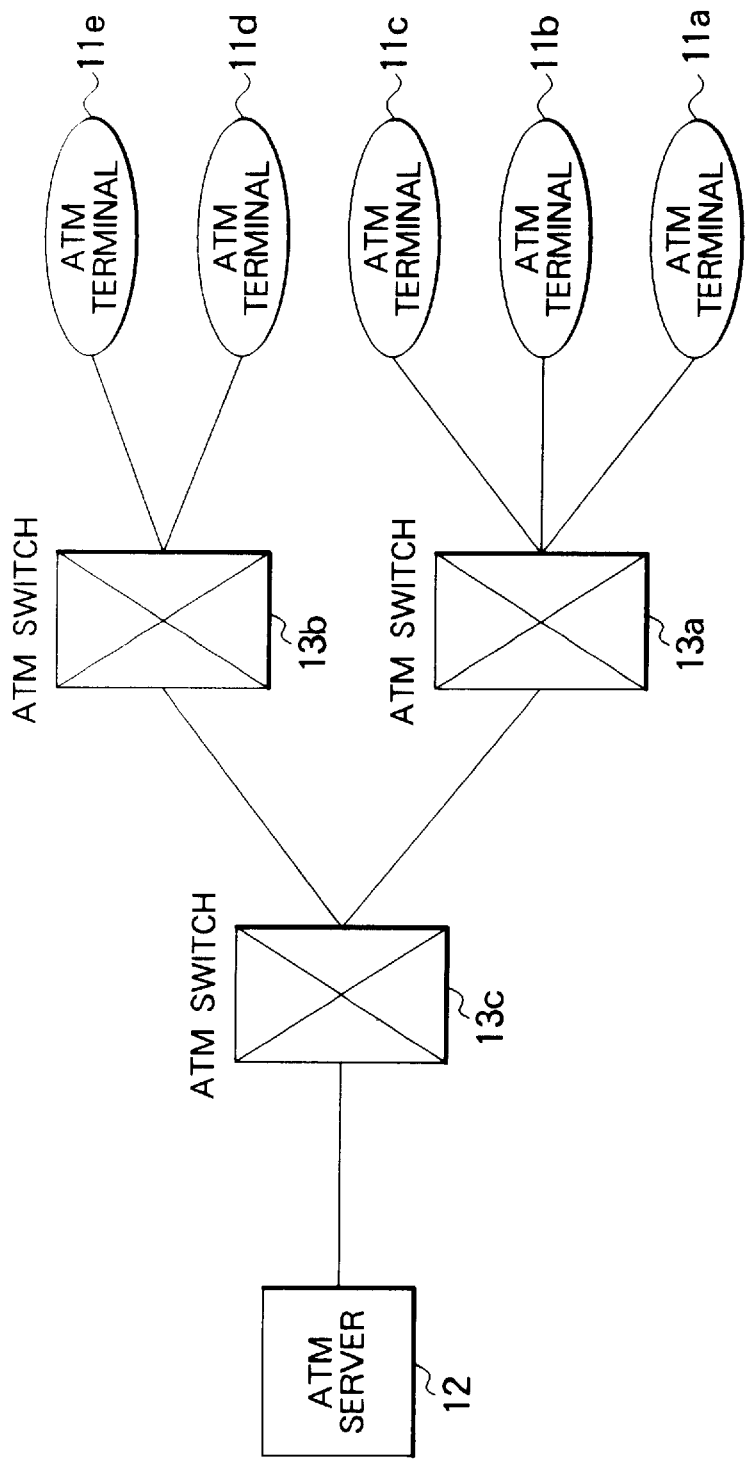
FIG. 7 is a block diagram for explaining an example of an ATM network system where the present invention is applicable.

DESCRIPTION OF THE PREFERRED EMBODIMENT:

Referring to FIG. 7, an ATM network, where the present invention is applicable, includes a plurality of ATM terminals 11a–11e and an ATM server 12. Between the ATM terminals 11a–11e and the ATM server 12 are provided a plurality of ATM switches 13a–13c. Lines are connected between the ATM server 12 and the ATM terminals 11a–11e and between the ATM terminals 11a–11e. Each of the ATM terminals 11a–11e and the ATM server 12 has an ATM adaptation layer cell resolution function and an ATM layer cell multiplexing function, and is capable of transmitting in sequence ATM cells via virtual channels VC assigned thereto in a time-division fashion and further receiving ATM cells.

As appreciated from this, each of the ATM terminals 11a–11e and the ATM server 12 is provided with a communication control device according to the present invention for transmitting and receiving the ATM cells via the virtual channels VC.

Figure 8:
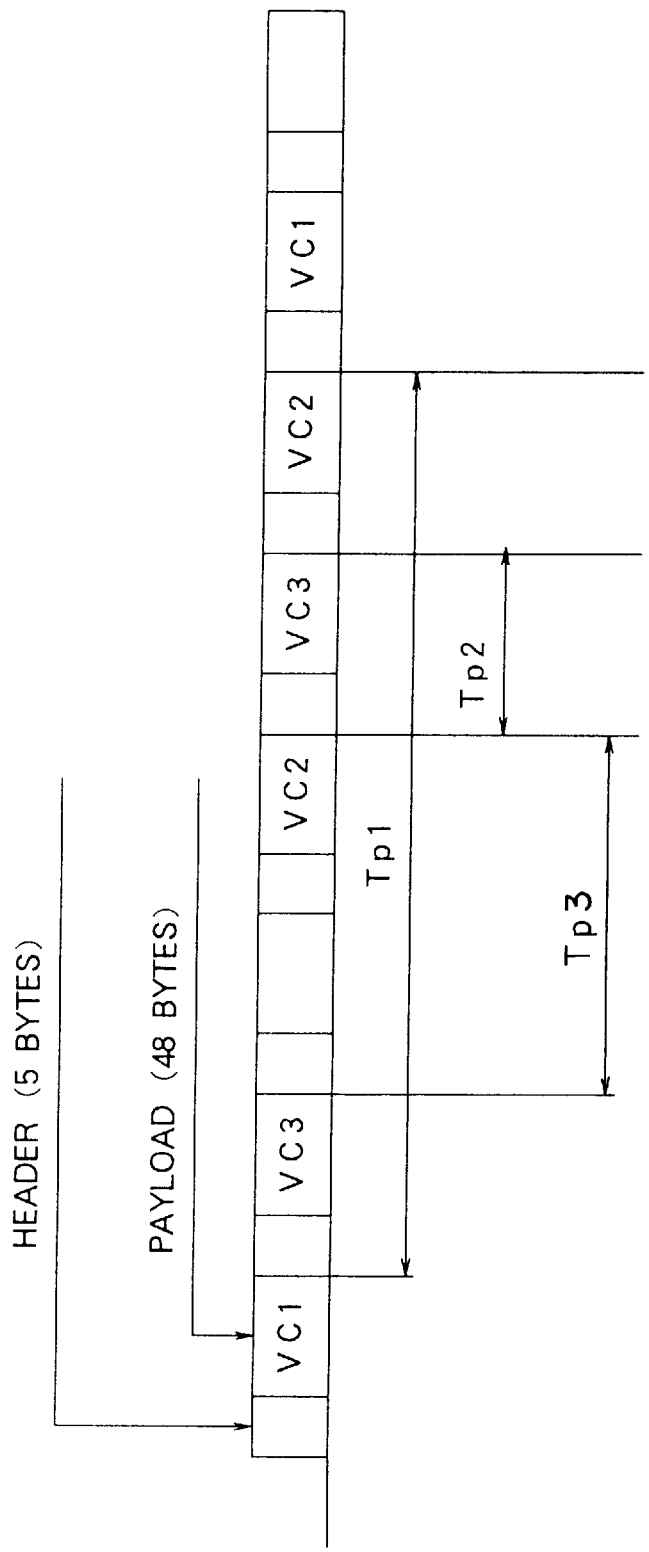
FIG. 8 is a diagram for explaining virtual channels to be used in FIG. 7.

For facilitating understanding of the present invention, the CBR mode and the ABR mode will be briefly explained with reference to FIG. 8. In the example shown, cells (here, ATM cells) for virtual channels VC1–VC3 are sent out on the line. As shown in the figure, each ATM cell is composed of a 5-byte header and a 48-byte payload including data and thus has a fixed length. In this example, VC1–VC3 appear per TP1–TP3, respectively, wherein TP1–TP3 represent peak rates determined for VC1–VC3, respectively. The peak rates TP1–TP3 represent minimum values of ATM cell intervals in VC1–VC3, respectively.

This means that it is necessary for the traffic sources, such as the ATM terminals 11a–11e and the ATM server 12, to transmit the ATM cells in the ATM network shown in FIG. 7 with at least intervals corresponding to the peak rates determined for VC1–VC3, respectively.

In the CBR mode, the ATM switches 13a–13c control the peak rates TP1–TP3 to be constant in VC1–VC3 during data transfer. On the other hand, in ABR mode, the peak rates TP1–TP3 of VC1–VC3 can be changed during data transfer under the control of the ATM switches 13a–13c. In either case, RM cells for managing the network are transmitted and received between the ATM terminals and the ATM switches or between the ATM server and the ATM switches.

Figure 1:
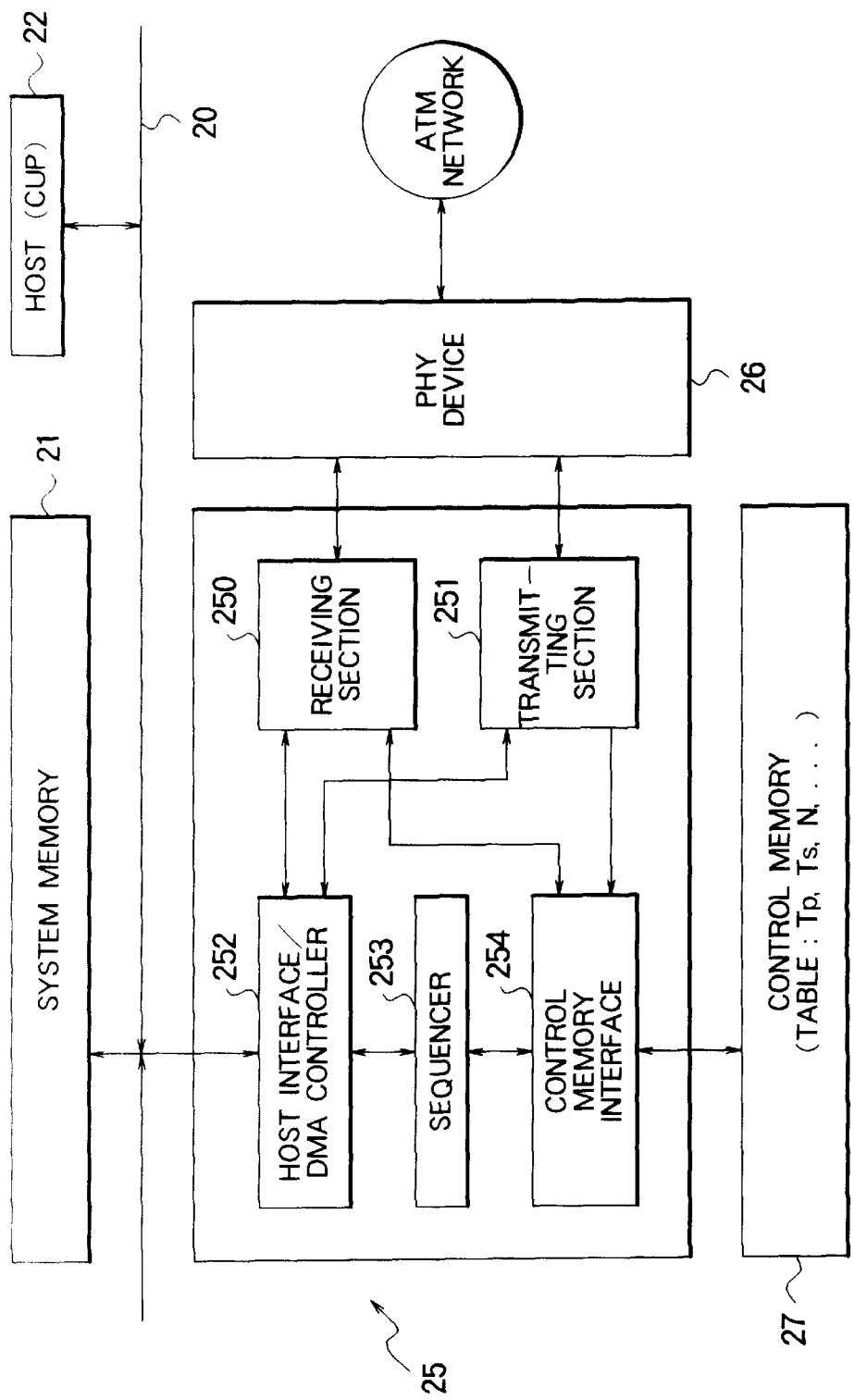
FIG. 1 is a block diagram for explaining an ATM device according to a preferred embodiment of the present invention.

FIG. 1 shows an ATM device operating as a communication control device according to a preferred embodiment of the present invention. The shown ATM device will be explained assuming that it is used as the ATM terminal or the ATM server shown in FIG. 7 and in the ABR mode ATM network.

The shown ATM device includes a system bus 20 to which are connected a system memory 21 for storing transmission data and received data, a host (CPU) 22 for controlling the whole system, and a transmission/reception control section 25 for performing transmitting/receiving operations with the ATM network in a later-described fashion. Between the transmission/reception control section 25 and the ATM network is provided a physical (PHY) device 26 having an ATM physical layer function. Further, to the transmission/reception control section 25 is connected a control memory 27 for storing later-described table and various control data. The transmission/reception control section 25 can be fabricated by an LSI chip.

The transmission/reception control section 25 includes a receiving section 250 connected to the PHY device 26, a transmitting section 251 connected to the PHY device 26, a host interface/DMA controller 252, a sequencer 253 and a control memory interface 254. The host interface/DMA controller 252 controls reading/writing operations of a register provided in the transmission/reception control section 25 and operations of reading/writing the transmission/received data relative to the system memory 21. The sequencer 253 controls the host interface/DMA controller 252 and the control memory interface 254 according to commands from the host 22.

The receiving section 250 and the transmitting section 251 are connected to the host interface/DMA controller 252 and the control memory interface 254 for transmitting/receiving the transmission/received data therethrough.

Figure 2:
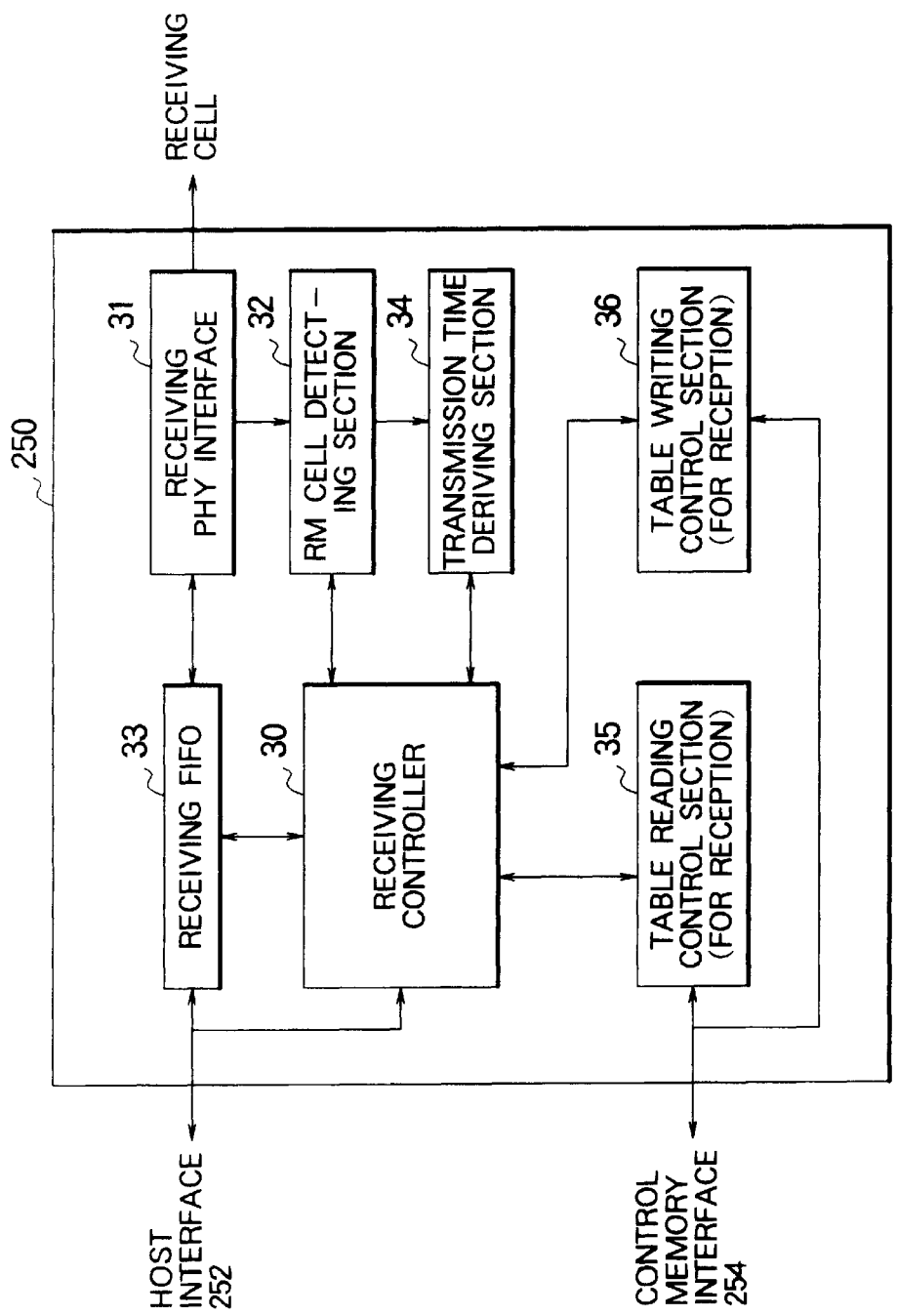
FIG. 2 is a block diagram for explaining a receiving section of the ATM device shown in FIG. 1.

Referring to FIG. 2, the receiving section 250 shown in FIG. 1 includes a receiving controller 30 for sequentially controlling elements in the receiving section 250 according to commands fed via the host interface/DMA controller 252.

The receiving section 250 further includes a receiving PHY interface 31, an RM cell detecting section 32, a receiving FIFO (first-in first-out memory) 33, a transmission time deriving section 34, a for-reception table reading control section 35 and a for-reception table writing control section 36. The control sections 35 and 36 are connected to the control memory interface 254 (see FIG. 1).

The receiving PHY interface 31 separates a 53-byte ATM cell fed from the PHY device 26 (see FIG. 1) into a 5-byte header and a 48-byte payload and sends the header to the RM cell detecting section 32. The RM cell detecting section 32 detects from a format of the header whether the received cell is an RM cell or not. If positive, the payload of the received cell is outputted to the transmission time deriving section 34. On the other hand, if the received cell is not the RM cell, the payload of the received cell is stored in the receiving FIFO 33 in sequence. The stored payload is then transferred to the system memory 21 (see FIG. 1) through the DMA operation.

When the RM cell is detected in the RM cell detecting section 32, the payload of the RM cell is given to the transmission time deriving section 34 where a time for transmitting an ATM cell next is calculated based on rate data and a current set value shown by the payload in the RM cell. Thus, the RM cell works as control data for deriving a transmission time, that is, a transmission timing.

The derived time is written in a table of the control memory 27 via the for-reception table writing control section 36 and the control memory interface 254 under the control of the receiving controller 30. On the other hand, data or the like necessary for the receiving operation is read out from a table of the control memory 27 via the reception table reading control section 35 and fed to the receiving controller 30 as required.

Figure 3:
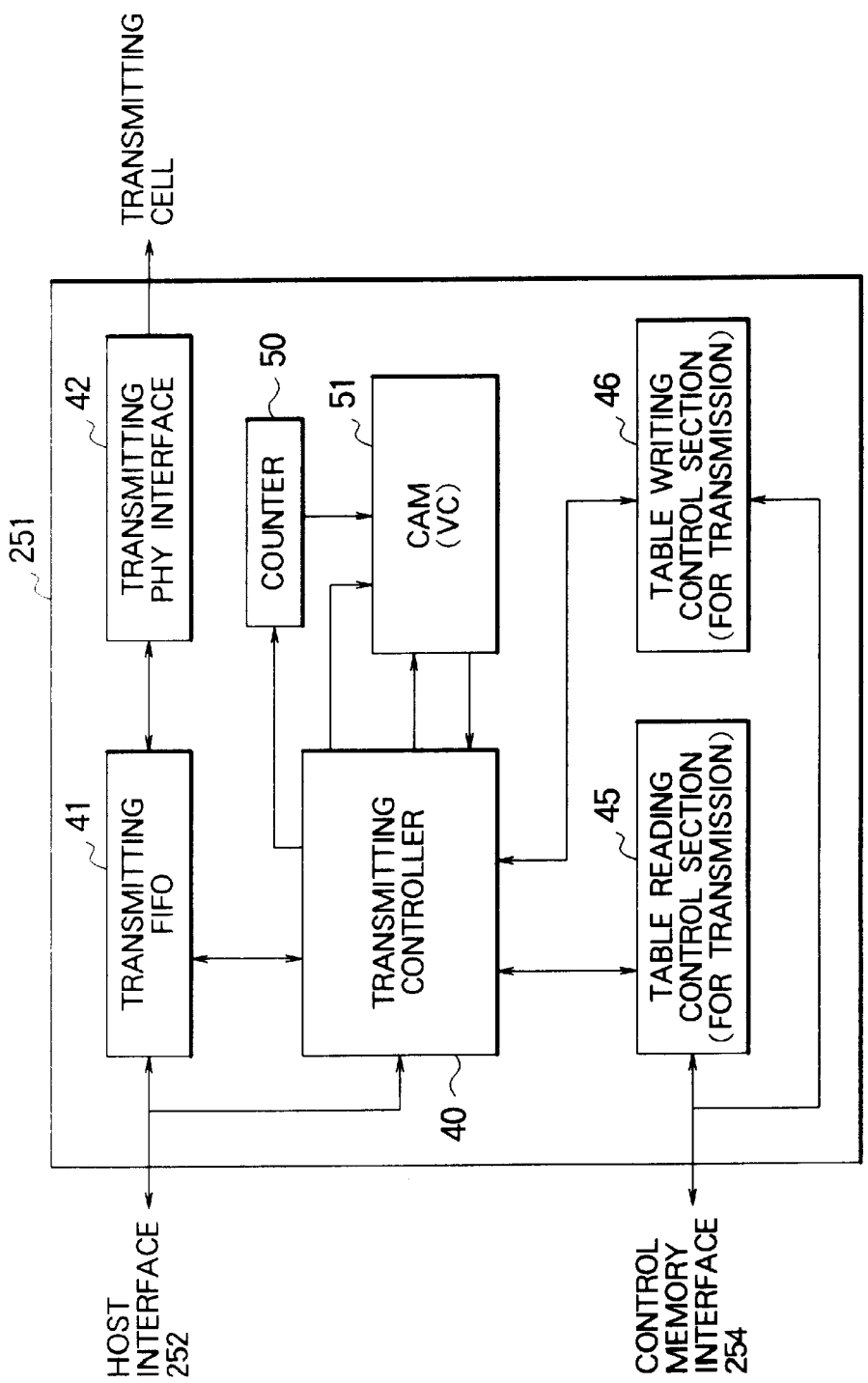
FIG. 3 is a block diagram for explaining a transmitting section of the ATM device shown in FIG. 1.

A structure of the transmitting section 251 shown in FIG. 1 will be described in detail with reference to FIG. 3. As shown in FIG. 3, the transmitting section 251 is also connected to the host interface 252 and the control memory interface 254 like the receiving section 250 and has a function to transmit an ATM cell to the PHY device 26.

Specifically, the transmitting section 251 includes a transmitting controller 40 connected to the host interface 252. The transmitting controller 40 controls elements in the transmitting section 251 in a later-described fashion. The transmitting section 251 further includes a transmitting FIFO 41 and a transmitting PHY interface 42 connected to the transmitting FIFO 41.

Under the control of the transmitting controller 40, a cell is formed by a cell payload including data transferred from the system memory 21 (see FIG. 1) through the DMA operation and a cell header including data from the control memory 27 (see FIG. 1), and stored temporarily in the transmitting FIFO 41 in sequence. The stored cell is transmitted in sequence to the PHY device 26 via the transmitting PHY interface 42 in the form of a 53-byte ATM cell. In this case, RM cells are also sent out via the transmitting PHY interface 42 like the other ATM cells. Thus, the transmitting FIFO 41 and the transmitting PHY interface 42 operate as ATM cell transmitting means.

The transmitting controller 40 is connected to the control memory interface 254 via a transmission table reading control section 45 and a transmission table writing control section 46, respectively. Under the control of the transmitting controller 40, the control sections 45 and 46 perform data reading and data writing relative to a table of the control memory 27.

The transmitting section 251 further includes a counter 50 and a CAM (content addressable memory), that is, an associative memory 51. The counter 50 and the CAM 51 are connected to the transmitting controller 40 for changing a transmission timing for a virtual channel VC depending on peak rates of the respective virtual channels VC.

Figure 4:
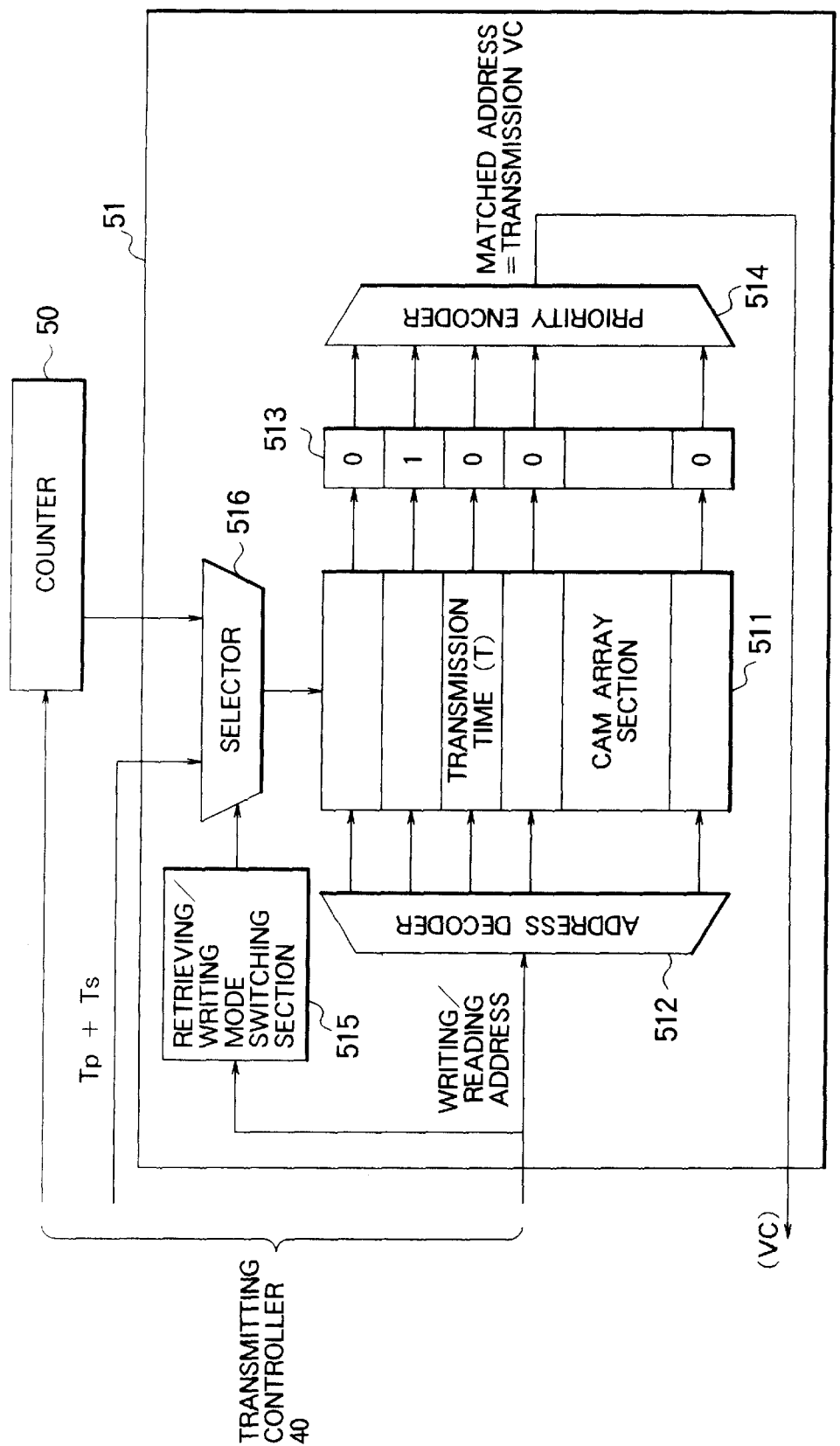
FIG. 4 is a block diagram for explaining a CAM shown in FIG. 3.

FIG. 4 shows a structure of the CAM 51 along with the counter 50 shown in FIG. 3. As shown in FIG. 4, the CAM 51 includes a CAM cell array section 511 including a plurality of cell arrays, an address decoder 512, a collating register 513, a priority encoder 514, a retrieving/writing mode switching section 515 and a selector 516. When data stored in the CAM cell array section 511 and data inputted as a retrieval pattern are matched or agreed with each other, the CAM 51 outputs an address of the stored data.

In this embodiment, a time value (T) representing a transmission timing for a virtual channel VC to be used next is written in a cell array of the CAM cell array section 511. When this time value (T) matches with a value identified by the counter 50, an address where this time value (T) is stored can be determined as a virtual channel VC for the next cell to be transmitted.

Specifically, for achieving the foregoing operation, the transmitting controller 40 feeds to the retrieving/writing mode switching section 515 a mode switching signal representing whether to set the CAM cell array section 511 is to be set to a retrieving mode or a writing mode. In response to the mode switching signal, the retrieving/writing mode switching section 515 sends a selection signal to the selector 516. In case of the retrieving mode, the selector 516 selects a counter value of the counter 50, while, in case of the writing mode, the selector 516 selects an output from the transmitting controller 40, that is, a time value (Tp+Ts) representing a transmission timing for the next virtual channel VC.

To the address decoder 512 of the CAM 51 is fed a writing address or a reading address from the transmitting controller 40. As a writing address or a reading address, a number of a virtual channel VC corresponding to a cell array in the CAM 51 is given.

In the writing mode, a time value representing a transmission timing for the next virtual channel VC is written in a cell array designated by a writing address. On the other hand, in the retrieving mode, a counter value of the counter 50 and time values in the cell arrays are compared, and an address of the matched cell array is outputted. In this embodiment, the collating register 513 having storage positions corresponding to the respective cell arrays is provided. A logical level "1" is stored in a storage position corresponding to the matched cell array, while a logical level "0" is stored in a storage position corresponding to the unmatched cell array.

In the foregoing structure, it is possible that a plurality of the matched cell arrays are detected. In view of this, in this embodiment, the priority encoder 514 is provided so that cell transmission is started from a virtual channel VC having a higher priority in sequence.

Now, referring to FIGS. 5 and 6, operations of the transmission/reception control section 25 and the control memory 27 shown in FIGS. 1 to 4 for transmitting the ATM cells will be described.

Figure 6:
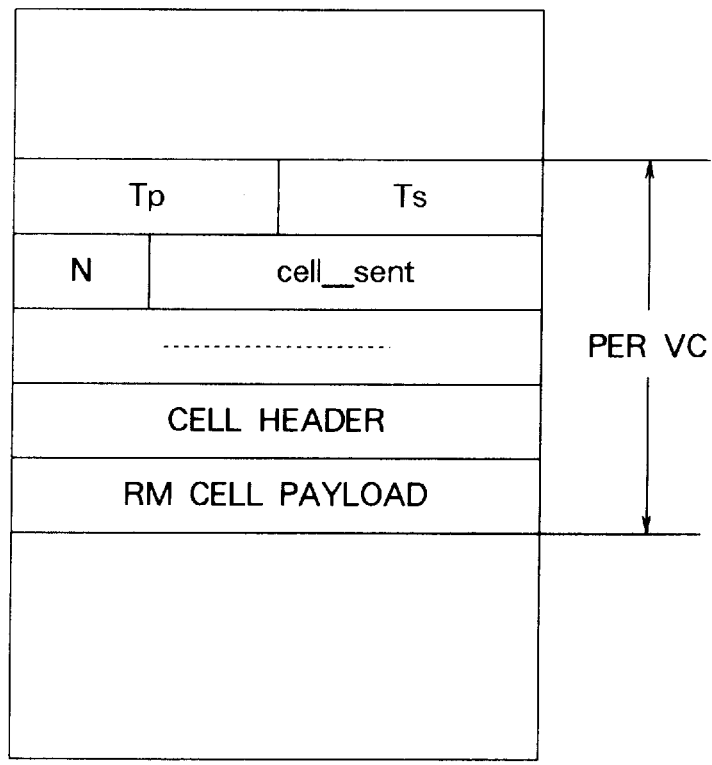
FIG. 6 is a diagram for explaining a table stored in a control memory shown in FIG. 1.

In the control memory 27, a table having a structure shown in FIG. 6 is stored. As seen from FIG. 6, a peak rate (Tp), a current CAM set value (Ts), the number N of sent ATM cells, a cell_sent flag representing whether an ATM cell in question is sent or not, a cell header and an RM cell payload are stored per virtual channel VC.

Figure 5:
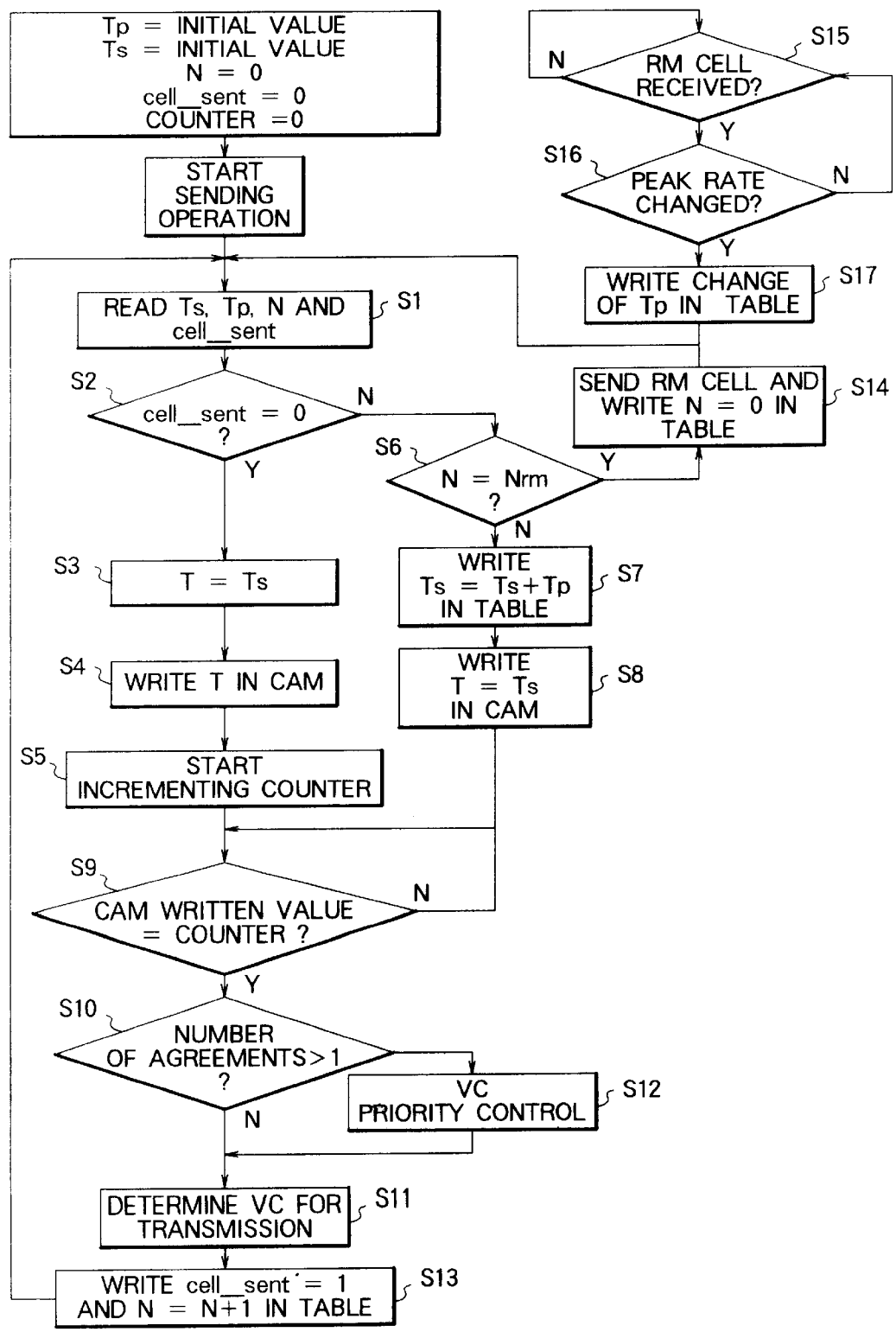
FIG. 5 is a flow chart for explaining an operation of the ATM device shown in FIG. 1.

As shown in FIG. 5, in an initialized state, Tp and Ts are set to initial values, N=0, cell_sent flag=0, and a counter value of the counter 50 is set to 0.

In this state, when an ATM cell sending operation is started in response to a command from the host 22 (see FIG. 1), the transmitting section 251 is operated via the host interface 252 in the transmission/reception control section 25. In the transmitting section 251, under the control of the transmitting controller 40, the transmission table reading control section 45 is operated so as to access the table of the control memory 27 via the control memory interface 254.

Then, as shown at step SI in FIG. 5, Ts, Tp, N and the cell_sent flag are read out from a region of the table assigned to the terminal in question and received at the transmission table reading control section 45. In this fashion, the transmission table reading control section 45 performs an operation of reading out data, such as Ts, Tp, N and the cell_sent flag, from the table in the control memory 27.

Read-out Ts, Tp, N and cell—sent flag are sent to the transmitting controller 40. In the transmitting controller 40, as shown at step S2, it is determined whether the cell—sent flag is 0. If cell_sent =0, the CAM set value, that is, the initial value Ts, is set as a transmission time T (step S3). Then, as shown at step S4, the transmitting controller 40 performs an operation of writing the transmission time T in the CAM 51. In this case, the transmitting controller 40 sends a mode switching signal to the retrieving/writing mode switching section 515 so as to set the CAM array section 511 to the writing mode, and further sends a writing address corresponding to the virtual channel VC to the CAM array section 511 via the address decoder 512. As a result, the initial value Ts is written in a CAM array corresponding to the virtual channel VC as the next transmission time T via the selector 516.

When the transmission time T is stored in the CAM array section 511, the transmitting controller 40 sets the selector 516 to the retrieving mode via the retrieving/writing mode switching section 515, and further sends a start signal to the counter 50 so that the counter 50 starts incrementing a counter value thereof (step S5).

Thereafter, in the CAM 51, a virtual channel VC to be used at the transmission time T is determined through a later-described operation. On the other hand, if the cell_sent flag is not 0 at step S2, that is, if the ATM cell has been transmitted, the transmitting controller 40 determines whether the read-out number N of the ATM cells reaches a given number Nrm which is required for sending an RM cell (step S6).

If N does not reach Nrm, the reception reading control section 35 of the receiving section 250 (see FIG. 2), under the control of the receiving controller 30, reads out the peak rate Tp and the current CAM set value Ts from the table of the control memory 27 and feeds them to the transmission time deriving section 34. The transmission time deriving section 34 adds Tp and Ts to derive a sum thereof, and sets this sum as a current CAM set value Ts. The transmission time deriving section 34 further controls the for-reception table writing control section 36 to write the new value Ts in the table of control memory 27 (step S7). As appreciated from the foregoing, the peak rate Tp is read out from the table under the control of the transmitting section 251. On the other hand, the current CAM set value Ts is written in the table under the control of the receiving section 250, while, as described later, is read out under the control of the transmitting section 251.

When the current CAM set value Ts is written in the table under the control of the receiving section 250 at step S7, the transmitting controller 40 sets the CAM 51 to the writing mode and sends a writing address corresponding to the virtual channel VC in question to the CAM 51. In this state, the transmitting controller 40 controls the transmission reading control section 45 (see FIG. 3) to read out the current CAM set value Ts stored in the table in the form of the foregoing sum as a next ATM transmission time T, and then outputs the read-out value Ts to the CAM 51. In the CAM 51, the inputted current CAM set value Ts is selected via the selector 516 and written in a CAM array corresponding to the virtual channel VC as the next transmission time T (step S8).

From step S5 or S8, the routine proceeds to step S9. Now, the selector 516 is set in the retrieving mode by the retrieving/writing mode switching section 515 so as to select the counter value of the counter 50 being sequentially incremented. In this state, in the CAM 51, the values (next transmission time T) stored in the CAM array section 511 and the counter value are compared with each other (step S9).

If agreement between the counter value and the stored value is detected at step S9, a logical level "1" representing "agreement" is stored in the collating register 513 (see FIG. 4). On the other hand, in case of "disagreement" at step S9, a logical level "0" is stored in the collating register 513. Subsequently, step S10 determines using the priority encoder 514 whether the number of agreements, that is, the number of logical levels "1", stored in the collating register 513 exceeds 1. If the number of agreements is only one, an address of the CAM array where the agreement is detected, is determined as a virtual channel VC for transmission (step S11). On the other hand, if the number of agreements exceeds 1 at step S10, the priority encoder 514 performs a priority control for a plurality of virtual channels VC so as to determine the virtual channel VC having a higher priority as a virtual channel VC for transmission (steps S12 and S11).

Thereafter, the transmission controller 40 sets the cell_sent flag to 1 and the number N of sent ATM cells to (N +1) and writes them in the table of the control memory 27 via the transmission table writing control section 46 (step S13). The operations in steps S6–S13 are repeated until the number N of sent ATM cells becomes equal to Nrm at step S6. The determined virtual channel VC is sent to the transmitting controller 40 where a header and a payload are arranged based on a transmission timing of the determined virtual channel VC so as to form an ATM cell. Then, the ATM cell is sent to the PHY device 26 (see FIG. 1) via the transmitting FIFO 41 and the transmitting PHY interface 42.

Now, explanation will be given to a case where the number N of sent ATM cells becomes equal to Nrm at step S6. In this case, the transmitting controller 40 transmits an RM cell to the PHY device 26 via the transmitting FIFO 41 and the transmitting PHY interface 42, and sets the number N of sent ATM cells in the table of the control memory 27 to 0 (step S14). Thereafter, as long as no RM cell is received at the receiving section 250 (see FIG. 2) from the ATM network, the transmitting section 251 repeats the operations in steps S1–S13.

Accordingly, as shown at step S15, the RM cell detecting section 32 in the receiving section 250 constantly monitors reception of the RM cell. If the RM cell detecting section 32 detects reception of the RM cell from the ATM network via the PHY device 26, the receiving controller 30 determines whether a change in peak rate Tp due to jamming or the like is instructed in the RM cell (step S16). As long as there is no change in peak rate Tp, steps S15 and S16 are repeated in the receiving section 250.

On the other hand, if the receiving controller 30 detects that a change in peak rate Tp is instructed in the RM cell received via the receiving PHY interface 31, the receiving controller 30 updates the peak rate Tp stored in the table of the control memory 27 with the received peak rate Tp via the reception table writing control section 36 (step S17). In this embodiment, as shown at step S7, the received peak rate Tp is sent from the RM cell detecting section 32 to the transmission time deriving section 34 where it is added to the current CAM set value Ts stored in the table to derive a sum thereof, and this sum is written in the table via the reception table writing control section 36. The foregoing current CAM set value Ts is fed to the receiving controller 30 from the control memory 27 via the reception table reading control section 35.

Now, it is assumed that the peak rate Tp and the current CAM set value Ts are set to 2 and 3, respectively, in the initialized state. In this case, 3 is written in the CAM 51 at step S4. On the other hand, after the cell—sent flag is set to 1, 5 which is the sum of Tp and Ts is written in the CAM 51 at step S8. As long as there is no change in Tp, 7 which is the sum of 5 and 2 is written in the CAM 51 at the next execution of step S8.

As in the foregoing fashion, the transmission time for the virtual channels VC can be determined in sequence. Further, when the peak rate Tp is changed, the transmission time for the virtual channels VC can be changed adaptively depending on a change of the peak rate. In the foregoing preferred embodiment, the CAM arrays are used. On the other hand, a similar operation can be achieved using a plurality of comparators and a normal memory. Further, although explanation has been made to the case where the present invention is applied to the ABR mode, the present invention is also applicable to the CBR mode.

In the foregoing preferred embodiment, explanation has been made to the ATM terminal or the ATM server. On the other hand, the transmission/reception control section 25 shown in FIG. 1 may also be a terminal connected to the LAN.

According to the foregoing preferred embodiment, since the transmission/reception control section 25, including further the control memory 27 if necessary, can be formed by an LSI chip, the structure can be made very compact in view of the hardware. Further, increment in number of the virtual channels VC can be dealt with only by increasing the memory capacity. Moreover, since no software switch is required, the cell transmission rate can be changed at high speed.

When the CAM arrays are used, the hardware can be further reduced, and even when agreements are detected simultaneously for a plurality of the virtual channels VC, it can be easily dealt with by performing the priority control.

While the present invention has been described in terms of the preferred embodiment, the invention is not to be limited thereto, but can be embodied in various ways without departing from the principle of the invention as defined in the appended claims.

What is claimed is:

1. A communication control device comprising:
    a transmitting section for outputting transmission data; and
    a receiving section for receiving and detecting predetermined data,
    said transmission section including timing means connected to said receiving section for updating a transmission timing of said transmission data based on said predetermined data, said predetermined data including at least a peak transmission rate, and said timing adjusting means updating said transmission timing by adding said peak transmission rate to a current transmission timing of said transmitting section, said transmitting section transmitting said transmission date in accordance with said updated transmission timing.

2. A communication control device for transmitting data over a virtual channel (VC) in a network comprising:
    a timing counter;
    an associative memory connected to said timing counter for storing a transmission timing at an address, said address corresponding to transmission data of said VC, said associative memory comparing an output of said timing counter and the stored transmission timing and outputting the address corresponding to the transmission timing that matches with the output of said timing counter;
    storing means for storing the transmission data;
    means connected to said associative memory and said storing means for carrying out a data accessing operation for said storing means with reference to said address that is outputted from said associated memory for retrieving said transmission data, and
    means for transmitting said transmission data along said VC.

3. A communication control device comprising:
    first storing means for storing transmission data;
    second storing means for storing a transmission timing of the transmission data;
    a timing counter;
    comparing means connected to said second storing means and said timing counter for comparing an output of said timing counter and an output of said second storing means;
    third storing means for storing a transmission interval of the transmission data;
    adding means connected to said second and said third storing means and said comparing means for adding an output read out from said third storing means to said transmission timing to derive a next transmission timing based on an output of said comparing means; and
    accessing means connected to said first storing means and said comparing means for carrying out a data accessing operation for said first storing means with reference to the output of said comparing means.

4. An ATM communication control device for transmitting ATM cells onto a line through virtual channels, said device comprising:
    first storing means for storing transmission data corresponding to each of the virtual channels;
    second storing means for storing transmission timings of said transmission data;
    a timing counter;
    comparing means connected to said second storing means and said timing counter for comparing an output of said timing counter and an output of said second storing means;
    third storing means for storing a transmission interval of the transmission data corresponding to each of the virtual channels;
    adding means connected to said second and said third storing means and said comparing means for adding an output read out by performing an address designation relative to said third storing means to the output of said second storing means to derive a next transmission timing based on an output of said comparing means; and accessing means connected to said first storing means and said comparing means for carrying out a data accessing operation for said first storing means with reference to the output of said comparing means.

5. An ATM communication control device as claimed in claim 4, further comprising a priority encoder which, when the output of said timing counter agrees with a plurality of outputs of said second storing means in said comparing means, selects and outputs one of said plurality of outputs according to a priority order thereof, wherein the data access is performed relative to said first storing means based on the output of said priority encoder.

6. An ATM communication control device for transmitting ATM cells onto a line through virtual channels, said device comprising:

first storing means for storing transmission data corresponding to each of the virtual channels;

second storing means for storing a transmission timing of said transmission data for each of the virtual channels;

a timing counter;

comparing means connected to said second storing means and said timing counter for comparing an output of said timing counter and an output of said second storing means;

third storing means for storing a transmission interval of the transmission data corresponding to each of the virtual channels;

fourth storing means for storing an address of said first storing means for each of the virtual channels;

adding means connected to said comparing means and said second and said third storing means for adding an output read out by performing an address designation relative to said third storing means to the output of said second storing means to derive a next transmission timing based on an output of said comparing means; and reading out means connected to said comparing means and said first and said fourth storing means for reading out the transmission data of said first storing means based on an output read out by performing an address designation relative to said fourth storing means based on the output of said comparing means, said reading out means transmitting said transmission data onto the line as an ATM cell.

7. A communication control method comprising the steps of:

counting timings in sequence;

storing transmission timings of transmission data into an associative memory;

comparing one of the counted timings with the stored transmission timings;

outputting from said associative memory, when the counted timing agrees with one or more of the stored transmission timings, an address corresponding to one of said transmission timings which is selected according to a priority order thereof; and accessing a storing device for storing the transmission data based on said address outputted from said associative memory.

8. A communication control method comprising the steps of:

comparing a value of a timing counter and transmission timings of data;

selecting and outputting, when one or more matches are detected by the step of comparing, an address corresponding to one of said transmission timings according to a priority thereof;

accessing a storing device based on the selected address;

adding the one transmission timing to a transmission interval of the data; and setting an adding result as a transmission timing of next data.

9. An ATM communication control method comprising the steps of:

comparing a value of a timing counter and transmission timings of data;

reading out transmission data from a region of a corresponding virtual channel in storing means depending on a comparing result and outputting said transmission data onto a line as an ATM cell;

adding a transmission timing of the transmission data and a transmission interval of the transmission data; and setting an adding result as a next data transmission timing.

10. An ATM communication control method as claimed in claim 9, further comprising the steps of:

selecting and outputting, when more than one transmission timings are detected as matching the value of the timing counter, addresses corresponding to the transmission timings according to a priority order thereof; and reading out transmission data from regions of corresponding virtual channels in the storing means based on the selected addresses and outputting said transmission data onto the line as ATM cells.

11. An ATM device comprising a receiving section for receiving ATM cells said receiving section comprising:

detecting means for detecting reception of a predetermined ATM cell among said ATM cells;

deriving means connected to said detecting means for deriving a transmission timing for a virtual channel assigned to said ATM device based on said predetermined ATM cell, and wherein said predetermined ATM cell defines a peak rate for said virtual channel, said deriving means adding a current transmission timing for the virtual channel and said peak rate so as to derive a next transmission timing for the virtual channel.

12. An ATM device as claimed in claim 11, further comprising a control memory for storing said peak rate, said current transmission timing and said derived transmission timing.

13. An ATM device as claimed in claim 12, further comprising a transmitting section, said transmitting section comprising:

a counter for indicating a transmission timing by means of a counter value;

determining means connected to said control memory and said counter for determining a virtual channel for transmission based on said counter value and said current transmission timing read out from said control memory; and transmitting means connected to said determining means for transmitting an ATM cell using said determined virtual channel.

14. An ATM device as claimed in claim 13, wherein said determining means comprises an associative memory having an address corresponding to each of the virtual channels, storing the current transmission timings corresponding to each of the virtual channels, and outputting, when the counter value agrees with the stored current transmission timings, the corresponding virtual channel.

15. An ATM device as claimed in claim 14, wherein said determining means further comprises a priority encoder for performing a priority control when the counter value agrees with a plurality of the stored current transmission timings.

16. An ATM device as claimed in claim 13, wherein said determining means comprises:

comparing means connected to said control memory and said counter for comparing the counter value with the current transmission timing read out from said control memory; and storing means connected to said comparing means for storing the virtual channel for which the counter value and the current transmission timing agree with each other.

17. An ATM device as claimed in claim 13, wherein said receiving section and said transmitting section are formed by a semiconductor integrated circuit chip.

18. An ATM device as claimed in claim 11, wherein said predetermined ATM cell comprises an RM cell.

* * * * *